United States Patent Office 3,061,583
Patented Oct. 30, 1962

3,061,583
STABILIZED VINYL RESIN COMPOSITIONS
James S. F. Huhn and Francis J. Sheets, Charleston, W. Va., assignors to Union Carbide Corporation, a corporation of New York
No Drawing. Filed Feb. 26, 1960, Ser. No. 11,140
8 Claims. (Cl. 260—45.7)

The present invention relates to stabilized vinyl resin compositions and to methods for their preparation. More particularly, the invention is concerned with the production of stabilized vinyl resin solutions which evidence improved resistance to discoloration when subjected to the action of heat.

Vinyl resins are in general well known to the art and find use in a number of diverse applications. Noteworthy among such uses is the role vinyl resins play in the manufacture of synthetic fibers. It is also well known that vinyl resins are sensitive to heat as manifested by discoloration. Thus, for example, in the production of synthetic fibers from vinyl resins, the resin is ordinarily dissolved in a suitable inert organic solvent by means of heat and thereafter maintained in solution at elevated temperatures for prolonged periods of time during which fiber spinning operations are conducted. As a consequence of these and other procedures involving the heating of a vinyl resin solution, the color of the solution has often been found to undergo a progressive yellowing or darkening. In turn, this discoloration has been found to engender an undesirable initial color in the fibers or other articles produced from the heated vinyl resin solution. It has therefore become customary to incorporate in vinyl resin solutions small amounts of stabilizing materials for the purpose of retarding or inhibiting the discoloration which would otherwise occur upon the application of heat.

Prominent among the compounds heretofore employed as stabilizers for vinyl resin solutions are triorganophosphorous compounds. Of these, particularly good results have been obtained using the triorgano phosphites having a structure corresponding to the general formula:

(I)

wherein R, R¹ and R² each designates an alkyl, aryl, aralkyl or alkaryl radical containing up to about 18 carbon atoms or slightly higher, and wherein at least one of the radicals designated by R, R¹ and R² is connected to the adjacent oxygen atom by a saturated aliphatic carbon atom. The alkyl radicals contemplated in this respect can be either linear, branch-chained or cyclic. In addition each of the radicals designated by R, R¹ and R² can be substituted by hydroxy, alkoxy, aryloxy, carbalkoxy or acyloxy radicals. As typical of the radicals designated by R, R¹ and R² there can be mentioned methyl, ethyl, propyl, isopropyl, butyl, pentyl, hexyl, 2-ethylhexyl, octyl, isooctyl, decyl, dodecyl, hexadecyl, octadecyl, cyclopentyl, cyclohexyl, phenyl, biphenyl, naphthyl, methylphenyl, ethylphenyl, phenylethyl, phenylhexyl, hydroxyethyl, methoxyethyl, phenoxyhexyl, carbethoxyethyl, propionoxyoctyl, benzoxyhexyl, hydroxyphenyl, methoxyphenyl, carbethoxyphenyl radicals and the like.

Another class of triorgano-phosphorus compounds heretofore employed as stabilizers for vinyl resin solutions are the triorgano phosphonites having a structure corresponding to the general formula:

(II

wherein R, R¹ and R² are as defined above and wherein at least one of the radicals designated by R¹ or R² is connected to the adjacent oxygen atom by a saturated aliphatic carbon atom.

A third class of triorgano-phosphorus compounds which have been employed as stabilizers for vinyl resin solutions are the triorgano phosphinites having a structure corresponding to the general formula:

(III)

wherein R, R¹ and R² are as defined above and wherein the radical designated by R² is connected to the adjacent oxygen atom by a saturated aliphatic carbon atom.

The incorporation of stabilizing quantities of the triorgano-phosphorus compounds hereinabove described in vinyl resin solutions has been found to contribute appreciably to the minimization of discoloration in such solutions upon exposure to the action of heat and represents a significant improvement over the use of other conventional stabilizers such as the lead and calcium salts of the higher fatty acids, the alcoholates of alkaline earth metals, various organotin salts such as dioctyltin maleate, etc. In large-scale commercial fiber-spinning operations, however, some variability in the stabilizing efficiency of the aforementioned triorgano-phosphorus compounds has been encountered. While the precise cause or causes of this variability is at present unknown, several conditions are believed to constitute underlying factors in this respect. One such condition is the exposure of the vinyl resin solution to high temperatures for considerable periods of time, thus taxing the stabilizing capacity of the triorgano-phosphorus compound. Another condition which may effect the efficiency of the triorgano-phosphorus stabilizer to some extent is the presence of water in the vinyl resin solution even in amounts as small as those commonly introduced as an impurity with the organic solvent for the resin. In this connection by way of illustration, discoloration of the vinyl resin solution containing the triorgano-phosphorus stabilizer has been found to progress somewhat more rapidly upon heating when water is also present therein. A third condition which may engender some variation in the effectiveness of the triorgano-phosphorus compounds as stabilizers for vinyl resin solutions is the exposure of the triorgano-phosphorus compound to moist air during storage precedent to its use as a stabilizer. Such storage has, for instance, often been found to reduce the efficiency of a given initial quantity of triorgano-phosphorus compound when subsequently employed as a stabilizer.

Unexpectedly, it has now been discovered that improved stabilizer compositions for use in conjunction with the stabilization of vinyl resin solutions are obtained by the addition to or incorporation with the triorgano-phosphorus compounds hereinabove described of a 1,2- or 1,3-epoxy compound having a boiling point below 200° C. at atmospheric pressure. The epoxy compound is preferably admixed with the triorgano-phosphorus compound as soon as possible after production of the latter compound and prior to any prolonged exposure of the triorganophosphorus compound to moisture. This mixture is subsequently incorporated in the vinyl resin solution in accordance with conventional stabilization techniques. In this manner, a maximum stabilizing effect can be achieved. However, improved results also accrue in accordance with this invention by the simultaneous or consecutive introduction of the triorgano-phosphorus compound and the epoxy compound to the organic solvent employed either prior to, during, or subsequent to the dissolution of the vinyl resin in the organic solvent. Moreover, under such circumstances, the introduction of the stabilizer combination is preferably made prior to both the dissolution of the vinyl resin and any heating step.

Through the practice of this invention it is possible to prepare vinyl resin solutions which are nearly colorless initially and which demonstrate improved resistance to discoloration upon heating even for prolonged periods of time. The fibers produced from such stabilized resin solutions have a very high degree of whiteness and are, in turn, more suitable for use in the textile field. Moreover, due to the incorporation of an epoxy compound with a triorgano-phosphorus compound as herein described, the stabilized vinyl resin solutions of this invention uniformly demonstrate a greater resistance to discoloration upon prolonged heating than do stabilized vinyl resin solutions containing only the triorgano-phosphorus stabilizer. Further, the stabilization of vinyl resin solutions in accordance with this invention advantageously is not affected to any substantial extent by the conventional presence of minor amounts of water, e.g. up to about 7 weight percent based upon the weight of the organic solvent employed or slightly higher, and is similarly unaffected by the previous exposure of the triorgano-phosphorus compound to moist air when the latter is in admixture with the epoxy compound.

In particular, the vinyl resins contemplated by this invention are those of the type prepared by the homopolymerization of acrylonitrile or by the copolymerization thereof with either vinyl chloride, vinylidene chloride or both. The preferred vinyl resins are those copolymers of acrylonitrile with either vinyl chloride and/or vinylidene chloride containing from about 35 to about 85 weight percent of acrylonitrile polymerized therein. It is to be noted in this respect that the term "copolymer," as employed herein, is meant to include terpolymer. Similarly, the term "copolymerization" is meant to define the polymerization of two or more different monomers.

The triorgano-phosphorus compounds contemplated by this invention include the triorgano-phosphites, the triorgano phosphonites and the triorgano phosphinites hereinabove defined in connection with Formulas I, II and III. As typical thereof there can be mentioned the following:

Trimethyl phosphite
Triethyl phosphite
Triisopropyl phosphite
Tributyl phosphite
Trihexyl phosphite
Tri-(2-ethylhexyl) phosphite
Triisooctyl phosphite
Tridecyl phosphite
Triisodecyl phosphite
Tridodecyl phosphite
Trioctadecyl phosphite
Tricyclohexyl phosphite
Diethyl butyl phosphite
Diphenyl ethyl phosphite
Dibutyl phenyl phosphite
2-methylphenyl dibutyl phosphite
2-phenylethyl dihexyl phosphite
Tri-(8-hydroxyoctyl) phosphite
Di-(2-hydroxyphenyl) butyl phosphite
Tri-(2-ethoxyethyl) phosphite
4-phenoxybutyl dibutyl phosphite
Tri-(2-phenoxyethyl) phosphite
Tri-(2-carboxyethyl) phosphite
Tri-(3-acetoxypropyl) phosphite
2-methoxyphenyl dibutyl phosphite
Trimethyl phosphonite
Tributyl phosphonite
Dibutyl phenylphosphonite
Tridodecyl phosphonite
Trioctadecyl phosphonite
Tricyclohexyl phosphonite
Didodecyl phenylphosphonite
Tri-(2-hydroxyethyl) phosphonite
Di-(2-methoxyethyl) phenylphosphonite
Dihexyl 2-ethoxyphenylphosphonite
Tri-(6-carbethoxyhexyl) phosphonite
Di-(4-acetoxybutyl) phenylphosphonite
Trimethyl phosphinite
Triethyl phosphinite
Trihexyl phosphinite
Tridodecyl phosphinite
Trioctadecyl phosphinite
Tricyclohexyl phosphinite
Tri-(2-hydroxyethyl) phosphinite
6-methoxyhexyl diphenylphosphinite
Tri-(2-carbethoxyethyl) phosphinite
4-acetoxybutyl dipropylphosphinite, and the like.

The preferred triorgano-phosphorus compounds are the trialkyl phosphites and especially those containing alkyl radicals each possessing from about 8 to about 12 carbon atoms.

The triorgano-phosphorus stabilizers utilizable in accordance with this invention also include those compounds produced by the reaction of the phosphites, phosphonites and phosphinites described above, as well as certain phosphines, with di-, tri- or polyhydric alcohols. Illustrative of such products are those produced by the reaction of 1,5-pentanediol with triethyl phosphite, diethyl phenylphosphonite or triphenyl phosphonite, etc.

The epoxy compounds to be employed in combination with the aforementioned triorgano-phosphorus compounds in the practice of this invention are the 1,2- and 1,3-epoxy compounds having a boiling point below 200° C. at atmospheric pressure. The use of these lower boiling epoxy compounds in combination with a triorgano-phosphorus compound as herein described permits the realization of improved stability for vinyl resin solutions. Moreover, it has been found that the lower boiling epoxy compounds are generally removed in substantial part from the vinyl resin environment during subsequent procedures such as by extraction in connection with fiber spinning operations and are therefore not present to any substantial extent in the articles produced from the stabilized vinyl resin solutions. The reduced quantity of epoxy compound in the solid vinyl resin products is desirable since the presence of larger, stabilizing quantities ordinarily may have an unwanted plasticizing effect upon the product. Therefore, the use of higher boiling epoxy compounds, viz. those boiling above 200° C., which cannot readily be removed from the vinyl resin environment upon subsequent utilization of the stabilized vinyl resin solutions is generally to be avoided in accordance with this invention.

Among the suitable epoxy compounds there can be mentioned the 1,2- and 1,3-alkylene oxides such as ethylene oxide, 1,2-propylene oxide, 1,2-butylene oxide, 1,3-butylene oxide, etc.; the substituted alkylene oxides such as epichlorohydrin, etc.; beta-propiolactone and the like. The preferred epoxy compounds are the unsubstituted 1,2-alkylene oxides, of which 1,2-propylene oxide is especially preferred.

Of the organic solvents which can be used to solvate the vinyl resin, particularly good results can be obtained using acetonitrile, acetone, the N,N-dialkylformamides and acetamides, ethylene carbonate and cyclohexanone. However, any other inert organic solvent for the vinyl resin which will not react with the stabilizer employed or with the resin itself can also be used.

The concentration of the triorgano-phosphorus compound to be incorporated in the vinyl resin solution in accordance with this invention can vary broadly. Preferably, concentrations effecting the presence in the vinyl resin solution of from about 0.01 to about 1 weight percent of phosphorus based upon the weight of the vinyl resin are employed, with especially good results realizable using concentrations effecting the presence of from about 0.05 to about 0.3 weight percent of phosphorus based upon the weight of the resin. Somewhat higher or lower concentrations of the triorgano-phosphorus compound may also be employed effectively.

The concentration of the epoxy compound to be employed in combination with the triorgano-phosphorus compound can also vary broadly, with good results attainable using concentrations of from about 0.2 to about 5 weight percent of the epoxy compound based upon the weight of the vinyl resin. Again, slightly higher or lower concentrations may also be employed effectively. The preferred concentration range in this connection is from about 1 to about 3 weight percent of the epoxy compound based upon the weight of the vinyl resin.

Upon the addition of the stabilizer combination as herein described the stabilized vinyl resin solutions of this invention can be used in any conventional manner or operation and evidence improved resistance to discoloration upon heating.

The invention is illustrated further by reference to the following examples of its practice but is not intended to be limited thereby.

EXAMPLE I

To each of three one-pint pressure bottles there were added 196 grams of acetone containing approximately 0.5 percent water. The bottles were then immersed in a "Dry Ice"-acetone bath until the contents of the bottles were cooled to a temperature of between about −30° C. and −40° C. Thereafter, approximately 0.6 gram of triisooctyl phosphite was added to each bottle. In addition, to one of the bottles, approximately 0.6 gram of ethylene oxide was also added, and to another, approximately 0.6 gram of 1,2-propylene oxide was added. Finally, to each of the bottles there were added 58.6 grams of a blend of acrylonitrile-vinyl chloride copolymer resins containing 40 weight percent of acrylonitrile and 60 weight percent of vinyl chloride copolymerized therein and having an average molecular weight such that the specific viscosity of a 0.2 percent solution of the resin blend in cyclohexanone at a temperature of 20° C. was 0.265. The total solids content in each bottle was 23 percent by weight based upon the weight of the total charge. The resin was solvated, in each instance, by heating the bottles with agitation in a steam bath at a temperature of about 50° C. for a period of about 30 minutes. The resin solutions were then heated in the steam bath with continued agitation at a temperature of about 100° C. for an additional period of about two hours. At the conclusion of this heating period, the color of the solutions in each of the bottles was compared and rated visually. The solutions containing the stabilizer combinations of the invention, viz. triisooctyl phosphite and either ethylene oxide, or 1,2-propylene oxide, evidenced approximately the same light yellow color. The solution containing only triisooctyl phosphite as a stabilizer, however, evidenced a deep orange color. The experiment thereby served to demonstrate the improved resistance to discoloration upon heating that can be achieved in vinyl resin solutions in accordance with this invention.

EXAMPLE II

In a manner and using equipment similar to that described in Example I, a series of experiments was conducted in which various other epoxy compounds were tested in combination with a triisooctyl phosphite stabilizer. In each instance, the amount of triisooctyl phosphite and epoxy compound introduced was approximately 1.2 grams (about 2 weight percent based upon the weight of the subsequently added vinyl resin). The vinyl resin and solvent were the same, and introduced in amounts as described in Example I. The solvation of the resin was effected by heating at a temperature of about 100° C. for a period of about 50 minutes. The solutions were then heated at a temperature of about 100° C. for an additional period of about two hours. For each epoxy compound tested, a control was also run containing only triisooctyl phosphite as a stabilizer. The epoxy compounds tested in this manner were 1,2-butylene oxide, epichlorhydrin and beta-propiolactone. In each instance, the vinyl resin solution containing both the triisooctyl phosphite and the particular epoxy compound employed evidence a light yellow color when observed visually. On the other hand, the control experiment for each run containing only the triisooctyl phosphite as a stabilizer produced a vinyl resin solution having a deep orange color. In this manner, the improved resistance to discoloration upon heating obtainable in accordance with this invention was again evidenced.

In another series of experiments conducted as hereinabove described, tri(2-ethylhexyl) phosphite, trihexyl phosphite, triisopropyl phosphite and tridodecyl phosphite were individually substituted for triisooctyl phosphite as the triorgano-phosphorus stabilizers. The epoxy compound employed was 1,2-propylene oxide. Here again, in each instance, the vinyl resin solution containing both the triorgano-phosphorus compound and 1,2-propylene oxide evidenced substantially less color development upon prolonged heating as did the vinyl resin solution produced in the control experiment for each run containing only the triorgano-phosphorus compound as a stabilizer.

EXAMPLE III

A series of experiments were conducted in a manner and using equipment similar to that described in Example I. The stabilizer combination employed consisted of 2 weight percent of triisooctyl phosphite and 2 weight percent of 1,2-propylene oxide based upon the weight of the vinyl resin. The vinyl resin employed was a terpolymer of acrylonitrile vinyl chloride and vinylidene chloride containing 69 weight percent of acrylonitrile, 20 weight percent of vinyl chloride and 11 weight percent of vinylidene chloride copolymerized therein and having a molecular weight such that the specific viscosity of a 0.2 weight percent solution of the resin in dimethyl formamide at a temperature of 29° C. was 0.334. The solvent employed was acetonitrile. In addition, water was present in the solutions tested in a concentration of about 5 weight percent based upon the weight of the solvent. The solids content of the solutions tested was 23 percent by weight based upon the weight of the total charge. In addition to one experiment in which a triisooctyl phosphite and 1,2-propylene oxide combination was employed, a control experiment was also conducted in which only triisooctyl phosphite was employed as stabilizer in an amount corresponding to 2 weight percent based upon the weight of the vinyl resin. The resin was solvated in each instance by heating at a temperature of about 50° C. for a period of about 30 minutes. The solutions were then heated at a temperature of about 100° C. for an additional period of about 30 minutes. At the conclusion of the heating period, the vinyl resin solution containing both the triisooctyl phosphite and the 1,2-propylene oxide evidenced a light yellow color when observed visually while the control experiment containing only the triisooctyl phosphite as a stabilizer produced a vinyl resin solution having a deep orange color.

EXAMPLE IV

In another series of experiments, one hundred-fifty grams of acetone were introduced to each of six one-pint pressure bottles and cooled by placing the bottles in an acetone-"Dry Ice" bath for about 30 minutes or until the temperature of the acetone reached approximately −20° C. One gram of triisooctyl phosphite was subsequently dissolved in the acetone in four of the bottles and 1 gram of 1,2-propylene oxide thereafter added to two of the bottles which also contained the triisooctyl phosphite. In addition, about 2 grams of water were added to one bottle containing only the triisooctyl phosphite stabilizer and to another containing both the triisooctyl phosphite and the 1,2-propylene oxide. Thereafter, 50 grams of a copolymer resin as described in Example I were added to each of the bottles. The bottles were placed in a steam bath at a temperature of about 50° C. for a period of about 30 minutes to effect solvation of the resin. Heating was then continued at a temperature of 80° C. for various periods of time as indicated below in Table A, whereby a clear resin solution was obtained containing 25 percent solids and suitable for the spinning of synthetic fibers. The color of the resin solutions were then determined quantitatively by measuring the transmission of light at a wave length of 430 millimicrons through a solution containing 4 percent resin and 12 percent acetone by weight, and prepared by weighing out approximately 5 grams of the resin solution into a two-ounce glass vial and adding thereto a volume of dimethyl formamide which in cubic centimeters was equal to 5.3 times the weight of the resin solution in grams. The results obtained from these experiments are tabulated below in Table A.

In the table, all percentages indicated are based upon the weight of the resin. The "color values" indicate the percent transmission of light at a wave length of 430 millimicrons through the resin solution, with high color values being preferred.

*Table A*

| Run No. | Water, Percent Added | Triisooctyl Phosphite, Percent Added | 1,2-Propylene oxide, Percent Added | Color Value After Heating at 80° C.—Hours | | |
|---|---|---|---|---|---|---|
| | | | | 0 | 5 | 8 |
| 1 | 0 | | | 85.8 | 64.4 | 60.0 |
| 2 | 0 | | 2 | 87.8 | 70.1 | 66.4 |
| 3 | 0 | 2 | | 86.8 | 81.4 | |
| 4 | 0 | 2 | 2 | | 86.9 | 84.9 |
| 5 | 6 | 2 | | 88.0 | 66.1 | 61.5 |
| 6 | 6 | 2 | 2 | 88.0 | 86.4 | 84.1 |

From the above table, the improved resistance to discoloration that is obtained when using the stabilizer combinations of this invention in vinyl resin solutions can readily be seen.

What is claimed is:

1. A stabilized vinyl resin solution suitable for use in the production of synthetic fibers, comprising (a) an organic solvent solution of a vinyl resin copolymer of acrylonitrile with at least one member selected from the group consisting of vinyl chloride and vinylidene chloride, said vinyl resin copolymer containing from about 35 to about 85 weight percent of acrylonitrile polymerized therein; (b) a trialkyl phosphite in an amount effecting the presence in said vinyl resin solution of from about 0.01 to about 1 weight percent of phosphorus based upon the weight of said vinyl resin; and (c) an epoxy compound selected from the group consisting of the unsubstituted 1,2- and 1,3-alkylene oxides containing from 2 to 4 carbon atoms in a concentration of from about 0.2 to about 5 weight percent based upon the weight of said vinyl resin.

2. A stabilized vinyl resin solution according to claim 1 wherein the trialkyl phosphite is triisooctyl phosphite.

3. A stabilized vinyl resin solution according to claim 1 wherein the trialkyl phosphite is tri(2-ethylhexyl) phosphite.

4. A stabilized vinyl resin solution according to claim 1 wherein the trialkyl phosphite is tridodecyl phosphite.

5. A stabilized vinyl resin solution according to claim 1 wherein the epoxy compound is 1,2-ethylene oxide.

6. A stabilized vinyl resin solution according to claim 1 wherein the epoxy compound is 1,2-propylene oxide.

7. A stabilized vinyl resin solution according to claim 1 wherein the compound is 1,2-butylene oxide.

8. A stabilized vinyl resin solution comprising (a) an organic solvent solution of a vinyl resin copolymer of acrylonitrile with at least one member selected from the group consisting of vinyl chloride and vinylidene chloride, said vinyl resin copolymer containing from about 35 to about 85 weight percent of acrylonitrile polymerized therein; (b) a trialkyl phosphite in an amount effecting the presence in said vinyl resin solution of from about 0.01 to about 1 weight percent of phosphorus based upon the weight of said vinyl resin; and (c) an unsubstituted 1,2-alkylene oxide containing from 2 to 4 carbon atoms, in a concentration of from about 0.2 to about 5 weight percent based upon the weight of said vinyl resin.

References Cited in the file of this patent

UNITED STATES PATENTS

| | | |
|---|---|---|
| 2,867,594 | Hansen et al. | Jan. 6, 1959 |
| 2,935,491 | Mack | May 3, 1960 |
| 2,938,877 | Mack et al. | May 31, 1960 |